United States Patent Office 3,018,965
Patented Jan. 30, 1962

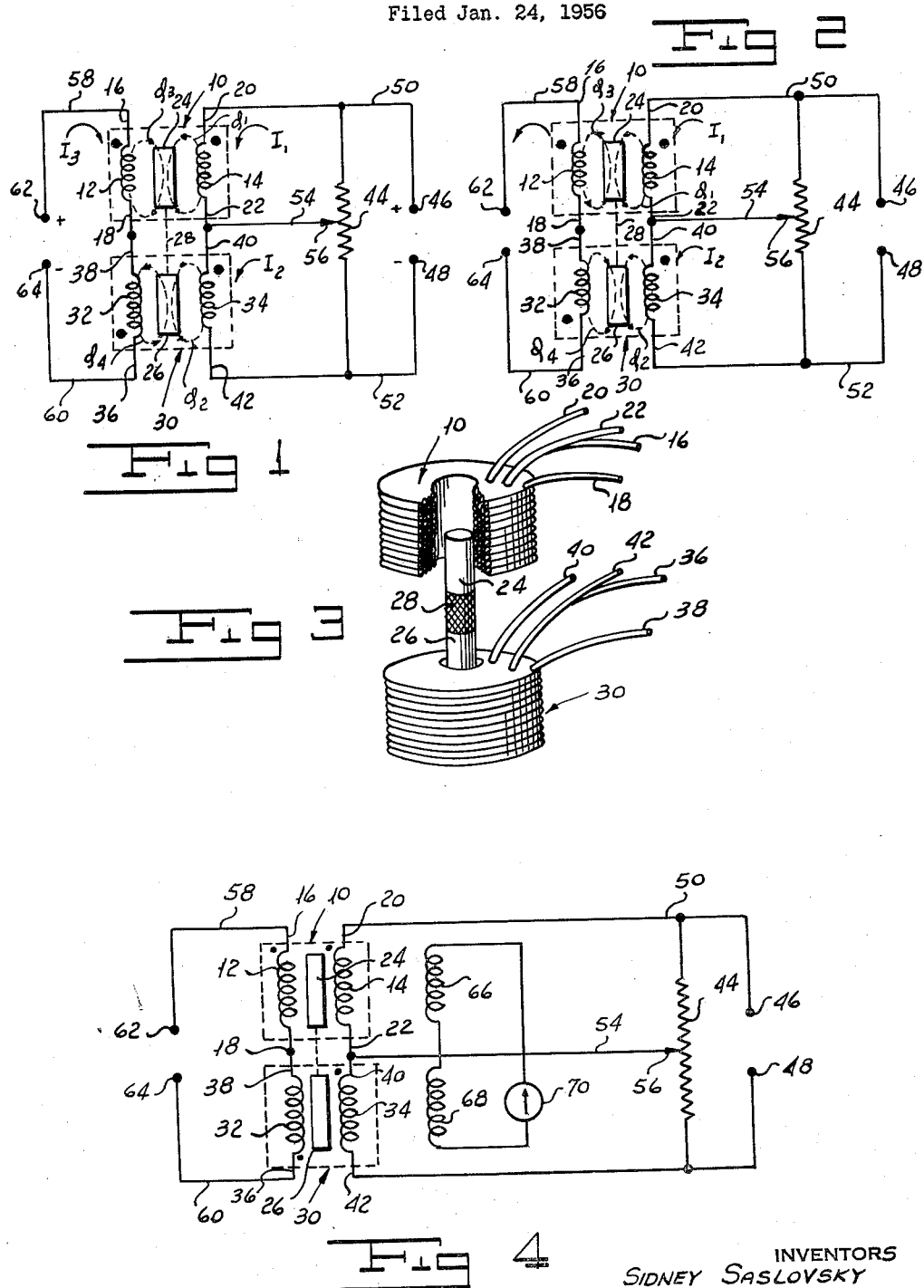

3,018,965
MOVABLE MAGNETIC CORE FORCE VECTOR
SUMMING DEVICE
Sidney Saslovsky, Bridgeport, Conn., and Carl Machover, Yorktown Heights, and Elliott J. Siff, Whitestone, N.Y., assignors, by mesne assignments, to United Aircraft Corporation, East Hartford, Conn., a corporation of Delaware
Filed Jan. 24, 1956, Ser. No. 560,982
4 Claims. (Cl. 235—189)

Our invention relates to a force summing device and more particularly to a force summing device for producing a force which is a function of the vector sum of two electrical signals.

Often it is desirable to produce a force which is a function of the vector sum of two electrical signals. One example of a system in which it is desirable to produce such a force is a gyroscope erecting system. In such a system it is advantageous to produce a single force which is a function of the vector sum of two corrective signals resulting from respective factors affecting the accuracy of the gyroscope.

One of the factors affecting the accuracy of an earth referenced gyroscope is the rotation of the earth about its axis. Various systems are known in the art for compensating gyroscopes for the error introduced owing to the rotation of the earth. Patent No. 2,573,626 to Taylor shows one such system in which the correcting means includes an electromagnet to which a sense of direction is given by a permanent magnet. Other systems employ pairs of electromagnets which act on a magnetic member carried by the member to which the correcting force is applied. An example of this type system is disclosed in Patent No. 2,606,448 to Carl L. Norden et al.

We have invented a force summing device for producing a force which is a function of the vector sum of two activating signals. While our device is of general application, it is particularly advantageous for use in a gyroscope erecting system. In such a system one of the activating signals may, for example, be proportional to the correction for rotation of the earth about its axis. Our device enables us vectorially to add this signal with a second signal to produce a force which is a function of the vector sum of two signals. The second signal may, for example, be proportional to the error between the vertical and the gyroscope vertical. As a result, we may provide a gyroscope erecting system which is also compensated for rotation of the earth. Our device uses no permanent magnets.

One object of our invention is to provide a force summing device for producing a force which is proportional to the vector sum or difference of two electrical signals.

Another object of our invention is to provide a force summing device for producing a force which is a function of the vector sum of two electrical signals without the use of permanent magnets.

A further object of our invention is to provide a force summing device which may be used in a gyroscope erecting system to produce a single force which compensates both for the error resulting from the rotation of the earth about its axis and for the error between the vertical and the gyroscope vertical.

Other and further objects of our invention will appear from the following description.

In general, our invention contemplates the provision of a force summing device including a first coil having first and third windings which act on a first core and a second coil having second and fourth windings which act on a second core. We mechanically link the first and second cores and pass currents from a first signal source through the first and second windings to produce a desired net pull on the linked cores. We connect the third and fourth windings in series-opposed relationship across a second signal source. The arrangement of our device is such that the net pull on the linked cores is a function of the vector sum or difference of the respective first and second signals.

In the accompanying drawings which form part of the instant specification and which are to be read in conjunction therewith and in which like reference numerals are used to indicate like parts in the various views:

FIGURE 1 is a schematic view of our force summing device in one condition of its operation.

FIGURE 2 is a schematic view of our force summing device in another condition of its operation.

FIGURE 3 is a perspective view of our force summing device with a part broken away.

FIGURE 4 is a schematic view of a form of our force summing device including means for indicating the net force produced by the activating signals. This same means can be utilized to indicate the position of the core.

Referring now to FIGURES 1 to 3 of the drawings, our force summing device includes a first coil, indicated generally by the reference character 10, made up of windings 12 and 14. Windings 12 and 14 include respective pairs of terminal conductors 16 and 18 and 20 and 22. Windings 12 and 14 are so disposed that they act on the same core 24 of a pair of cores 24 and 26 formed of magnetic material and joined mechanically by a diamagnetic connector 28.

Our device includes a second coil, indicated generally by the reference character 30, made up of windings 32 and 34. Windings 32 and 34 include respective pairs of terminal conductors 36 and 38 and 40 and 42. Windings 32 and 34 act on core 26.

We connect the respective terminals of a voltage dividing resistor 44 to the terminals 46 and 48 of a first source of electrical potential by conductors 50 and 52. We connect terminal conductors 22 and 40 of windings 14 and 34 and join terminal conductors 20 and 42 conductively to the respective conductors 50 and 52 to connect windings 14 and 34 in series-aiding relationship across the first signal source including terminals 46 and 48. A conductor 54 connects the brush 56 associated with dividing resistor 44 to the common terminal of conductors 22 and 40.

We connect the respective terminal conductors 18 and 38 of windings 12 and 32 and connect the terminal conductors 16 and 36 to conductors 58 and 60 connected to the respective terminals 62 and 64 of a second source of electrical potential to connect windings 12 and 32 in series-opposed relationship across the second signal source.

With a given polarity of the first signal source, currents of directions indicated by the arrows $I_1$ and $I_2$ in FIGURE 1 pass through the respective windings 14 and 34. The magnitudes of the currents are determined by the coil impedances, by the strength of the first signal source and by the position of brush 56 on voltage dividing resistor 44. As is well known, the pulls exerted by the respective windings 14 and 34 on cores 24 and 26 are in directions to reduce the reluctance of the magnetic paths of the fluxes $\phi_1$ and $\phi_2$ linking the respective cores 24 and 26. Conveniently, we select winding 14 to have a number of turns equal to the number of turns in winding 34. Cores 24 and 26 are substantially identical. The magnitudes of the respective pulls exerted by windings 14 and 34 are proportional to the strengths of the currents $I_1$ and $I_2$. The net pull on the assembly including cores 24 and 26 is a function of the difference between the currents $I_1$ and $I_2$. If desired, we may pass a predetermined initial current through the coil including windings 14 and 34 to saturate cores 24 and 26 to make the net pull a linear function of the difference between currents $I_1$ and $I_2$.

In one application of our force summing device, we impress a signal source of constant amplitude on the terminals 46 and 48. The wiper arm 56 of voltage divider resistor 44 is positioned by gravity in a manner familiar to the art. Currents $I_1$ and $I_2$ are then proportional to the error between the vertical and the gyroscope vertical. For the second signal source, which we connect to terminals 62 and 64, we select, for example, a device (not shown) which produces an output signal proportional to the necessary correction for rotation of the earth. This output signal may be obtained from a resolver, not shown since it is known to the art, which produces an output signal in accordance with latitude to afford the necessary correction for rotation of the earth.

If the signal applied to the terminals 62 and 64 of our device is in phase with the signal applied to terminals 46 and 48, a current $I_3$, the direction of which is indicated by the arrow in FIGURE 1, flows through windings 12 and 32. Resultant fluxes $\phi_3$ and $\phi_4$ link respective cores 24 and 26. For convenience we select the number of turns in winding 12 to equal the number of turns in winding 32. With this relationship, since the same current $I_3$ flows through both windings, they exert equal and opposite pulls on cores 24 and 26. Consequently, no net pull on the core assembly is exerted by windings 12 and 32 considered alone. Since we connect windings 12 and 32 in series-opposing relationship, the flux $\phi_4$ has a polarity which is opposite to the polarity of flux $\phi_3$. As can be seen by reference to FIGURE 1, if the first signal source and second signal source produce signals which are in phase, fluxes $\phi_1$, $\phi_2$ and $\phi_3$ have one polarity while flux $\phi_4$ has the opposite polarity. Fluxes $\phi_1$ and $\phi_3$ which link core 24 add vectorially to produce a pull on core 24 in the same direction. Fluxes $\phi_2$ and $\phi_4$ subtract vectorially to reduce the pull downwardly as viewed in FIGURE 1 on core 26 from the pull which results from flux $\phi_2$ alone. In other words, the application to terminals 62 and 64 of a signal which is in phase with a signal applied to terminals 46 and 48 increases the upward pull on core 24 and decreases the downward pull on core 26. The net pull on the core assembly, therefore, increases in an upward direction. The magnitude of this net upward pull is a function of the magnitudes of the currents in the respective windings.

It is to be noted that either direct current or alternating current signals may be applied to the respective pairs of terminals 46 and 48 and 62 and 64. If alternating current potentials are used, the frequencies of the respective signals must be the same or one must be an odd multiple of the other. If alternating current signals which are in phase are used, one half cycle fluxes of the polarities indicated in FIGURE 1 will exist in the respective windings. On the next half cycle the polarities of all the fluxes reverse, with the result that the net pull on the core assembly remains the same.

As can be seen by reference to FIGURE 2, when the polarity of the signal applied to terminals 62 and 64 is out of phase with the signal applied to terminals 46 and 48, the respective fluxes $\phi_1$ and $\phi_3$ linking core 24 from windings 14 and 12 oppose each other, while the respective fluxes $\phi_2$ and $\phi_4$ linking core 26 from windings 34 and 32 aid each other. With this phase relationship of the signals applied to the respective pairs of terminals 46 and 48 and 62 and 64, the upward pull on core 24 decreases from the pull which exists as a result of the flux $\phi_1$ acting alone. In this condition the downward pull on core 26 increases from the pull which exists as a result of the flux $\phi_2$ acting alone. It will be seen that with this polarity relationship the net pull on the core assembly including cores 24 and 26 is downward as viewed in FIGURE 2. The magnitude of this pull is a function of the magnitudes of the currents in the respective windings.

From the foregoing description it will be seen that the net pull exerted on the core assembly including cores 24 and 26 is proportional to the magnitudes of the currents flowing through the respective windings. The direction of this net pull is determined by the phase relationship between the respective signals applied to the pairs of terminals 46 and 48 and 62 and 64. The net pull is a function of the vector sum of the signals. If we pass an initial saturating current through a pair of the coils 14 and 34 or 12 and 32, the net pull is proportional to the vector sum of the signals.

Referring now to FIGURE 4, we may arrange a pair of windings 66 and 68, connected in the same manner as the connected coils carrying the smaller currents, concentric with respective coils 10 and 30. We connect a meter 70 across windings 66 and 68. In this form of our invention the signals applied to the respective pairs of terminals 46 and 48 and 62 and 64 must be alternating current signals. The net directions and magnitudes of the fluxes in cores 24 and 26 result in the net pull on the core assembly including cores 24 and 26. The net fluxes in cores 24 and 26 also induce voltages in windings 66 and 68 respectively. Windings 66 and 68 are so connected that when the fluxes in cores 24 and 26 are equal the voltages induced in windings 66 and 68 are equal and opposite so that the net voltage across meter 70 is zero. As the fluxes in cores 24 and 26 change so as to produce a net pull on the core assembly the voltage induced in one of the windings 66 or 68 increases while the voltage induced in the other winding decreases thereby producing a voltage difference indicated by meter 70. Since the net pull on the core assembly and the net voltage across meter 70 are both caused by the net flux in cores 24 and 26, the indication on meter 70 is a measure of the magnitude of the net pull on the core assembly.

In use of our force summing device in a gyroscope erecting system, we apply a constant signal to terminals 46 and 48 and connect a gravity sensitive voltage divider 44 across our device. If we wish to have our device produce a net pull which is a linear function of the difference currents in the respective windings, we make the magnitude of the constant signal connected to terminals 46 and 48 sufficient to produce a saturating current through windings 14 and 34. We apply a signal proportional to the necessary correction for rotation of the earth to the terminals 62 and 64 of our device. This signal may conveniently be obtained from a resolver driven in accordance with latitude, as is well known in the art. If the signal applied to terminals 62 and 64 is in phase with the signal applied to terminals 46 and 48, fluxes of the polarities indicated in FIGURE 1 link the respective windings of the device. As is explained hereinabove, with this condition the device produces a predetermined net pull in the upward direction on the assembly including cores 24 and 26. The magnitude of this pull is proportional to the vector sum of the magnitudes of the respective currents flowing in windings 12 and 32 and in windings 14 and 34.

As has been explained hereinabove, the potentials applied to the respective terminals 46 and 48 and 62 and 64 may be alternating current potentials or direct current potentials. If alternating potentials are employed, on one-half cycle of in-phase potentials the flux polarities are as indicated in FIGURE 1 with a net pull upward. On the succeeding half cycle the polarities of all fluxes reverse and the net pull remains the same.

If the respective signals applied to the pairs of terminals 46 and 48 and 62 and 64 are out of phase, the flux polarities shown in FIGURE 2 exist. As has been explained hereinabove, with these flux polarities a net pull in a downward direction is exerted on the core assembly. The magnitude of this pull is proportional to the vector sum of the magnitudes of the respective currents flowing in windings 12 and 32 and in windings 14 and 34.

It will be seen that the net pull exerted on the assembly including cores 24 and 26 has a direction depending on the phase relationship between the respective potentials applied to pairs of terminals 46 and 48 and 62 and 64. The magnitude of the net pull is a function of the magnitudes of the respective signals. Thus the net pull is a function of the vector sum or difference of the potentials.

When our device is used in a gyroscope erecting system, the core assembly is carried by the gyroscope member to which the correcting torque is to be applied. When we are correcting as described hereinabove for the earth's rotation and for the error between the vertical and the gyroscope vertical, our device produces a net force which corrects the gyroscope both for vertical error and for the rotation of the earth. In this manner we achieve a single force which includes two corrections. It is to be noted that our device employs no permanent magnets. In the form of our invention shown in FIGURE 4, meter 70 affords an indication of the magnitude of the net force.

It will be seen that we have accomplished the objects of our invention. We have provided a force summing device which produces a net force which is a function of the vector sum of two electrical signals. Our device is especially adapted for use in gyroscope erecting systems. It includes no permanent magnets.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A device for producing a force which is a function of the vector sum of a pair of signals including in combination a first core forming an element of a first magnetic circuit, a first winding disposed adjacent the first core, a second winding disposed adjacent the first core, said first magnetic circuit providing a flux path for flux provided by current flow through said first and second windings, a second core forming an element of a second magnetic circuit having negligible coupling with said first magnetic circuit, means mechanically connecting said second core to the first core for movement therewith, a third winding disposed adjacent said second core, a fourth winding disposed adjacent said second core, said second magnetic circuit providing a flux path for flux produced by current flowing through said third and fourth windings, means electrically connecting said first and third windings in series-aiding relationship, means electrically connecting said second and fourth windings in series-opposed relationship, a source of a first electrical signal, means for applying said first electrical signal to said series-connected first and third windings, a source of a second electrical signal and means for applying said second electrical signal to said series-connected second and fourth windings to produce a force on said connected cores tending to displace said cores through a distance proportional to the vector sum of said first and second signals.

2. A device as in claim 1 in which the means for applying the first signal is a voltage divider comprising a resistor connected across the first and third windings, said first and third windings having a common terminal and a brush connected between said resistor and the common terminal.

3. A device as in claim 1 in which said first and second windings comprise a coil surrounding the first core and said third and fourth windings comprise a coil surrounding the second core.

4. A device as in claim 1 including fifth and sixth windings disposed adjacent the respective first and second cores, means connecting said fifth and sixth windings in series and indicating means connected across the fifth and sixth windings.

References Cited in the file of this patent
UNITED STATES PATENTS

| | | |
|---|---|---|
| 1,019,213 | Adams | Mar. 5, 1912 |
| 1,857,452 | Hausman et al. | May 10, 1932 |
| 2,067,489 | Howey et al. | Jan. 12, 1937 |
| 2,182,071 | Crossley | Dec. 5, 1939 |
| 2,339,021 | Lingel | Jan. 11, 1944 |
| 2,430,757 | Conrad et al. | Nov. 11, 1947 |
| 2,686,893 | Markson | Aug. 17, 1954 |
| 2,829,338 | Lord | Apr. 1, 1958 |
| 2,903,665 | Davis | Sept. 8, 1959 |